US012686138B2

(12) United States Patent
Kaul

(10) Patent No.: US 12,686,138 B2
(45) Date of Patent: Jul. 21, 2026

(54) DUAL FLOW INTEGRATED SUCTION TOOL FOR ROBOTIC END-EFFECTORS

(71) Applicant: Toyota Research Institute, Inc., Los Altos, CA (US)

(72) Inventor: Lukas S. Kaul, Mountain View, CA (US)

(73) Assignees: Toyota Research Institute, Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 951 days.

(21) Appl. No.: 17/966,468

(22) Filed: Oct. 14, 2022

(65) Prior Publication Data

US 2024/0001566 A1     Jan. 4, 2024

Related U.S. Application Data

(60) Provisional application No. 63/357,828, filed on Jul. 1, 2022.

(51) Int. Cl.
*B25J 15/06*          (2006.01)
*B25J 13/08*          (2006.01)

(52) U.S. Cl.
CPC ......... *B25J 15/0625* (2013.01); *B25J 13/087* (2013.01)

(58) Field of Classification Search
CPC .... B25J 15/0625; B25J 13/087; F25B 43/006; B60H 1/3205; A61M 1/984; B01L 3/0217
See application file for complete search history.

(56) References Cited

U.S. PATENT DOCUMENTS

| | | | |
|---|---|---|---|
| 5,591,460 A | 1/1997 | Wanstrath et al. | |
| 7,729,796 B2 | 6/2010 | Hartrampf et al. | |
| 8,911,815 B2 | 12/2014 | Kram et al. | |
| 9,782,901 B1 * | 10/2017 | Lo | B25J 15/0683 |
| 2020/0306996 A1 | 10/2020 | Kieffer et al. | |
| 2020/0312700 A1 * | 10/2020 | Kang | H10P 72/78 |
| 2021/0170604 A1 | 6/2021 | Lawson | |
| 2021/0308664 A1 * | 10/2021 | Birkenholz | B01L 3/0217 |
| 2022/0063038 A1 | 3/2022 | Monsarrat et al. | |

FOREIGN PATENT DOCUMENTS

| | | | | |
|---|---|---|---|---|
| CN | 206166841 U | | 5/2017 | |
| CN | 107975963 A | * | 5/2018 | F25B 49/043 |
| EP | 3771576 A1 | * | 2/2021 | B60H 1/3205 |
| EP | 3933302 A1 | * | 1/2022 | F25B 43/006 |
| WO | 2013053794 A1 | | 4/2013 | |
| WO | WO-2021053465 A1 | * | 3/2021 | A61M 1/984 |

OTHER PUBLICATIONS

English translation of CN 107975963 (Year: 2018).*

* cited by examiner

*Primary Examiner* — Gene O Crawford
*Assistant Examiner* — Sydney Jeanine Simmons
(74) *Attorney, Agent, or Firm* — Dinsmore & Shohl LLP

(57) ABSTRACT

A robotic arm includes a suction tool including a suction mechanism, a first pump, and a second pump. The first pump is operable to provide a first suction force and a first flow rate to the suction mechanism, and the second pump is operable to provide a second suction force and a second flow rate to the suction mechanism. A connection member places the first pump and the second pump in fluid communication with the suction mechanism.

19 Claims, 4 Drawing Sheets

DUAL FLOW INTEGRATED SUCTION TOOL FOR ROBOTIC END-EFFECTORS

CROSS-REFERENCE TO RELATED APPLICATION

This application claims priority to and the benefit of U.S. Provisional Patent Application No. 63/357,828, filed Jul. 1, 2022, for "Dual Flow Integrated Suction Tool For Robotic End-Effectors," the contents of which are hereby incorporated by reference in their entirety.

TECHNICAL FIELD

The present specification generally relates to suction tools and methods of operating suction tools, and more specifically, to dual flow integrated suction tools for robotic end-effectors.

BACKGROUND

Suction tools are a versatile way of gripping a variety of items and often have advantages over traditional finger-grip style tools. Typical suction tools include a suction cup for creating a seal between the suction tool and an object, a pump to create a pressure differential between the inside of the suction tool and an outside environment, and a connection (e.g., tube, hose) between the pump and the suction tool. In operation, the flow rate and the pressure differential generated by the pump generally determine the performance of the suction tool. However, these two performance metrics are subject to a trade-off, such that traditional pumps can either achieve a high airflow or a strong vacuum, but not both.

SUMMARY

In one embodiment, a robotic arm includes an arm segment; and a suction tool provided at an end of the arm segment, the suction tool includes: a suction mechanism; a first pump operable to provide a first suction force and a first flow rate to the suction mechanism; a second pump operable to provide a second suction force and a second flow rate to the suction mechanism; and a connection member placing the first pump and the second pump in fluid communication with the suction mechanism.

In another embodiment, a suction tool includes: a suction mechanism; a first pump operable to provide a first suction force and a first flow rate to the suction mechanism; a second pump operable to provide a second suction force and a second flow rate to the suction mechanism; a connection member placing the first pump and the second pump in fluid communication with the suction mechanism; and an electronic control unit that independently operates each of the first pump and the second pump based on a detected pressure within the suction mechanism, wherein the second suction force is greater than the first suction force and the first flow rate is greater than the second flow rate.

In yet another embodiment, a method includes: positioning a suction mechanism of a suction tool adjacent an object; activating a first pump generating a first flow rate and a first suction force within the suction mechanism and a second pump generating a second flow rate and a second suction force within the suction mechanism; creating a seal between the suction mechanism and the object; detecting an internal pressure within the suction mechanism of the suction tool using a pressure sensor; and determining if the internal pressure is less than or equal to a first threshold pressure, equal to or greater than a second threshold pressure, or between the first threshold pressure and the second threshold pressure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals in which:

Figure 1:
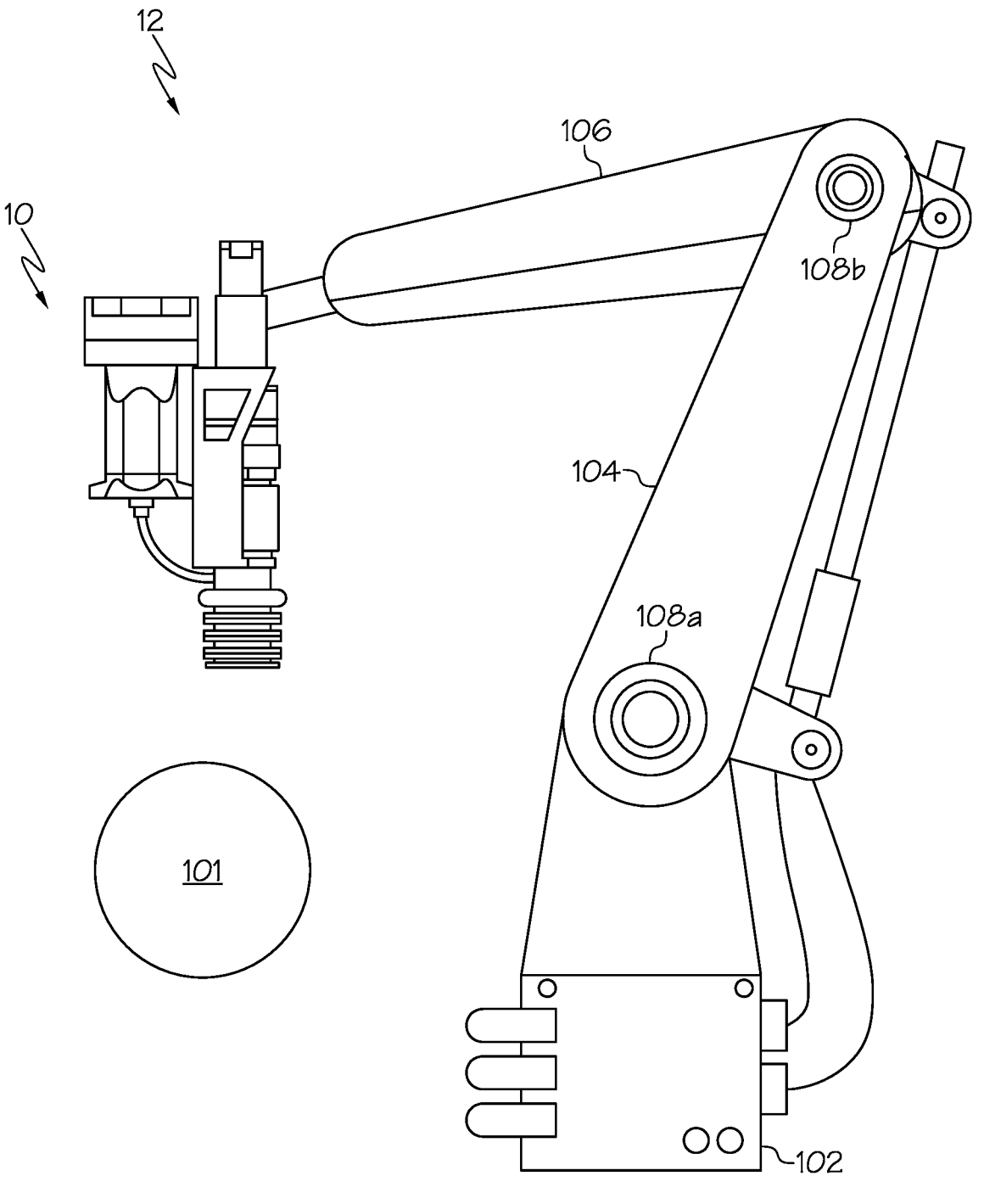
FIG. 1 schematically depicts an illustrative robotic arm having a suction tool, according to one or more embodiments shown and described herein.

Corresponding reference characters indicate corresponding parts throughout the several views. The exemplifications set out herein illustrate at least one embodiment of the present disclosure, and such exemplifications are not to be construed as limiting the scope of the present disclosure in any manner.

DETAILED DESCRIPTION

Embodiments of the present disclosure are directed to a suction tool and methods for operating a suction tool. For example, in embodiments, a suction tool may include a suction mechanism, a first pump, and a second pump. The first pump may be operable to provide a first suction force and a first flow rate, and the second pump may be operable to provide a second suction force and a second flow rate. In some embodiments, the second suction force may be greater than the first suction force, and the second flow rate may be less than the first flow rate. The suction tool may further include a connection member that places the first pump and the second pump in fluid communication with the suction tool. In some embodiments, the suction tool may further include an electronic control unit that may independently operate each of the first pump and the second pump in response to a detected level of suction at the suction tool.

In traditional suction tools, the suction mechanism is positioned at an end effector of a robot, such that the suction mechanism may be in direct contact with an object to be grasped. As utilized herein, the term "end effector" may refer to a device or tool that is connected to an end of a robotic arm and is the part of the robot that interacts with an environment.

Furthermore, the pumps of the suction tool may be located at any position, so long as the pump are sufficiently connected to the suction mechanism. Depending on the location of the pumps, the suction tool may be considered an "integrated suction tool" or a "distributed suction tool". As provided herein, the term "integrated suction tool" may refer to a suction tool having the pumps directly adjacent to the suction mechanism. In contrast, the term "distributed suction tool" may refer to a suction tool that has the pumps positioned away from the end effector of the robot (e.g., at the base of the robotic arm, etc.), such that a hose is utilized to connect the pumps to the suction mechanism.

It should be understood that, given the positioning of the pumps adjacent the suction mechanism, integrated suction tools are easier to integrate into existing robot systems, as no hose needs to be routed along the robotic arm in order to operate the suction tool. However, space at the end effector of the robot is often limited, which can restrict the size of the pumps that may be utilized in an integrated suction tool. These restrictions may lead to reduced pressure and/or airflow capabilities within the suction tool.

To maximize performance of the suction tool, the suction tool may preferably optimize the flow rate and the differential pressure of the suction tool. The suction tool described herein optimizes performance by utilizing two compact pumps, with a first pump being operable to optimize the flow rate of the suction tool and a second pump being operable to optimize the pressure differential of the suction tool. By connecting both pumps to the suction mechanism and monitoring the pressure differential between the inside of the suction mechanism and an external environment (e.g., ambient pressure), the suction tool may ensure that an acceptable seal is maintained between the suction mechanism and an object throughout an entire suction operation.

Embodiments of suction tools and methods for operating suction tools will now be described in more detail herein with reference to the drawings and where like numbers refer to like structures.

Referring now to the drawings, FIG. 1 depicts an illustrative robotic arm 12 including an end effector for performing one or more functions. In embodiments, the end effector includes one or more tools such as, for example, a suction tool 10 for manipulating an object 101. The illustrative robotic arm 12 depicted in FIG. 1 may provide particular use in pick-and-drop applications. However, it should be appreciated that the robotic arm 12 is not limited to this use and may be used for other purposes without departing from the scope of the present disclosure.

In some embodiments, the robotic arm 12 may generally include a base 102 coupled to one or more arm segments (e.g., a first arm segment 104 and/or a second arm segment 106) via one or more joints 108a, 108b thereby providing the robotic arm 12 with a wide range of motion. As robotic arms for pick-and-drop applications are generally understood, the robotic arm 12 depicted in FIG. 1 is not described in further detail herein. In addition, although the robotic arm 12 is depicted as including the suction tool 10 located at an end of the one of the second arm segment 106, it should be appreciated that the suction tool 10 may be located at any suitable location of the robotic arm 12.

Figure 2:
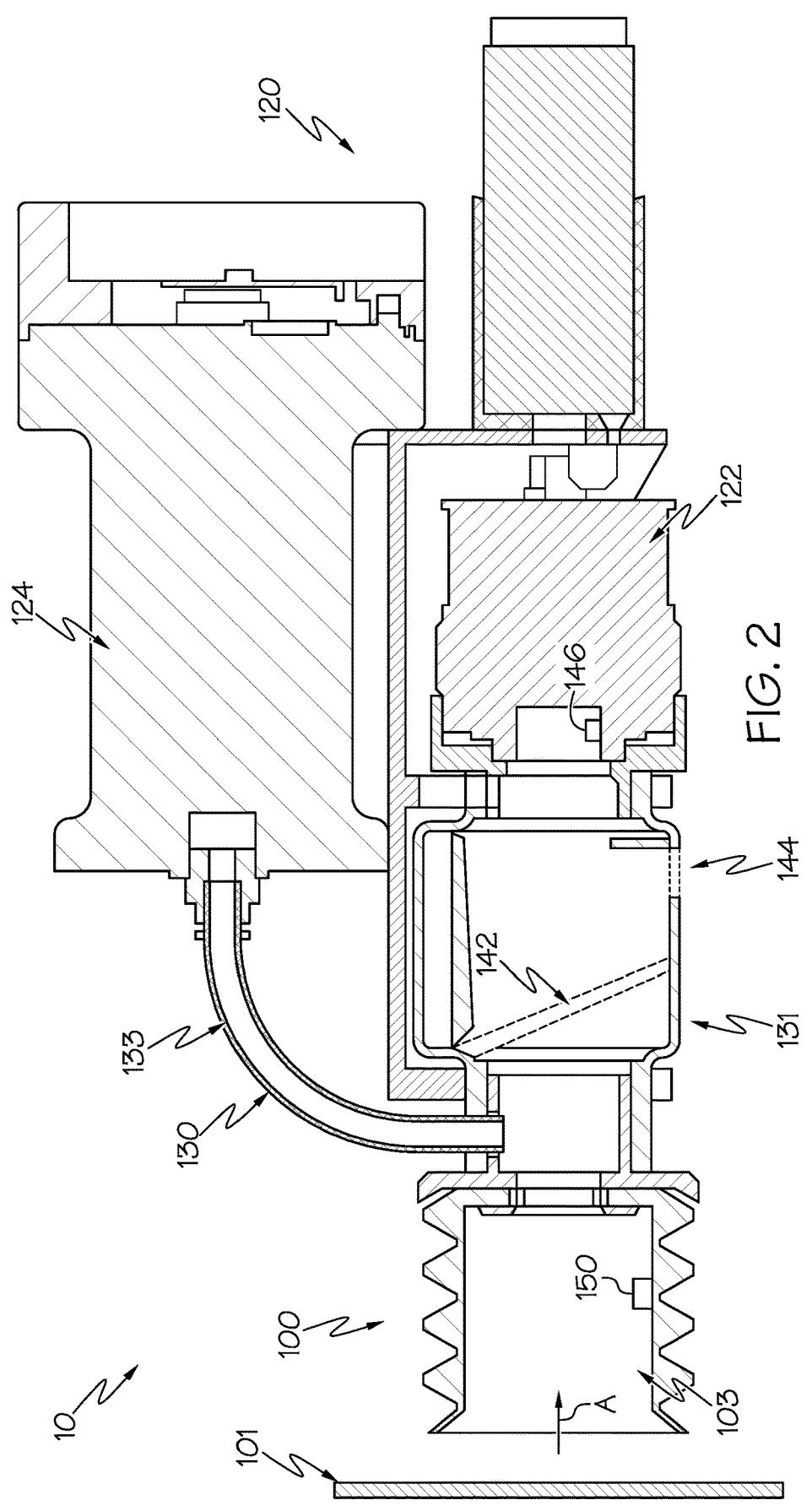
FIG. 2 is a cross-sectional view of the suction tool of FIG. 1, according to one or more embodiments shown and described herein.

Referring now to FIG. 2, a schematic view of a suction tool 10 is depicted. The suction tool 10 may include a suction mechanism 100, such as a suction cup, bellows, or other suitable mechanism, which may be used to releasably couple the suction tool 10 to an object 101 by drawing the object 101 in the direction of arrow A when the suction tool 10 is operated, as discussed in more detail herein. Although the suction mechanism 100 is depicted in FIG. 2 as being a suction cup, it should be understood that the suction mechanism 100 may take any suitable form such that the suction mechanism 100 couples the suction tool 10 to the object 101. For example, in some embodiments, the shape of the suction mechanism 100 may correspond to the shape of the object 101 being gripped by the suction tool 10.

The suction tool 10 may further include a plurality of pumps 120, where each of the plurality of pumps 120 is fluidly coupled to the suction mechanism 100. For example, as depicted in FIG. 2, the suction tool 10 may include a first pump 122 and a second pump 124. In these embodiments, a connection mechanism 130 (e.g., a hose, tube, etc.) may be used to fluidly couple the first pump 122 and the second pump 124 to the suction mechanism 100. It should be understood that the connection mechanism 130 may fluidly couple the first pump 122 and the second pump 124 to the suction mechanism 100 via any suitable connection (e.g., threaded connection, adhesive, welding, brazing, etc.). In embodiments, the connection mechanism 130 may include a first connection part 131 extending from the first pump 122 to the suction mechanism 100, and a second connection part 133 extending from the second pump 124 to the first connection part 131. As such, the first pump 122 is in fluid communication with the suction mechanism 100 via the first connection part 131, and the second pump 124 is in fluid communication with the suction mechanism 100 via the second connection part 133 and the first connection part 131. However, it should be appreciated that, in embodiments, the second connection part 133 may be in direct fluid communication with the suction mechanism 100 without being connected to the first connection part 131.

Referring still to FIG. 2, the plurality of pumps 120 may be positioned adjacent the suction mechanism 100, such that the suction tool 10 is arranged as an integrated suction tool. In these embodiments, the entire suction tool 10 may be positioned at an end effector of a robot, or other similar device, which may be used to position the suction tool 10 adjacent the object 101 to be gripped during a suction operation. Although the suction tool 10 is depicted as being an integrated suction tool, it should be understood that, in some embodiments, the suction tool 10 may be arranged as a distributed suction tool. In these embodiments, the plurality of pumps 120 may be positioned at a base of the robot and the suction mechanism 100 may be positioned at the end-effector of the robot.

Referring still to FIG. 2, the first pump 122 and the second pump 124 may each be operable to optimize a working parameter of the suction tool 10, such as a flow rate or a pressure differential of the suction tool 10. Although reference will be made herein to the flow rate and the pressure differential of the suction tool 10, it should be understood that the plurality of pumps 120 may be operable to optimize any number of working parameters of the suction tool.

To optimize the working parameters of the suction tool 10, the first pump 122 may provide a first suction force and a first flow rate to the suction mechanism 100, while the second pump 124 may similarly provide a second suction force and a second flow rate to the suction mechanism 100. Notably, the first flow rate and the second flow rate provided by the first pump 122 and the second pump 124, respectively, may help ensure that imperfect seals are avoided between the suction mechanism 100 and the object 101 being gripped, and may further make the initial creation of a seal between the suction mechanism 100 and the object 101 easier. Furthermore, the first suction force and the second suction force may work to achieve a near perfect vacuum within the suction mechanism 100 by creating the highest possible pressure differential between a pressure within an interior 103, the suction mechanism 100, and ambient pressure.

In these embodiments, the first pump 122 may be a high flow pump, such that the first pump 122 may be responsible for increasing the flow rate of the suction tool 10. Furthermore, the second pump 124 may be a high pressure pump, such as a high pressure differential pump, that may be used to increase the pressure differential between the inside 103 of the suction mechanism 100 and ambient pressure outside of the suction mechanism 100. In these embodiments, the first pump 122 may be operable to provide a first flow rate that is greater than the second flow rate provided by the second pump 124. In contrast, the second pump 124 may be operable to provide a second suction force to the suction mechanism 100 that is greater than the first suction force provided by the first pump 122.

It should be noted that, because of the high airflow generated by the first pump 122, a cross-section of the first connection part 131 of the connection mechanism 130 between the first pump 122 and the suction mechanism 100 is sufficiently large to facilitate the high airflow. In these embodiments, the cross-section of the first connection part 131 of the connection mechanism 130 extending between the first pump 122 and the suction mechanism 100 is larger than a cross-section of the second connection part 133 of the connection mechanism 130 extending between the second pump 124 and the first connection part 131.

Referring still to FIG. 2, the suction tool 10 may further include a plurality of valves associated with the plurality of pumps 120. For example, the suction tool 10 may include a first valve 142 and a second valve 144, both of which may be moved between an open position (solid lines) and a closed position (dashed lines).

In these embodiments, the plurality of valves may be operable to control interactions between the plurality of pumps 120 and the suction mechanism 100. For example, as depicted in FIG. 2, the first valve 142 may be a shutoff valve and may be positioned between the first pump 122 (e.g., the high flow pump) and the suction mechanism 100, for example, within the first connection part 131, such that the first valve 142 may be operable to control the connection between the first pump 122 and the suction mechanism 100. In these embodiments, the first valve 142 may be positioned between the first pump 122 and the suction mechanism 100, such that when the first valve 142 is in the open position (solid lines), the first pump 122 may fluidly communicate with the suction mechanism 100. In contrast, when the first valve 142 is moved to the closed position (dashed lines), fluid communication between the first pump 122 and the suction mechanism 100 may be obstructed. In these embodiments, the first valve 142 may be manually moved between the open position and the closed position, such as by an external lever (not shown), or may be controlled via an electronic control unit, as will be described in additional detail herein.

Referring still to FIG. 2, the second valve 144 may be a bypass valve, which may control fluid communication between the first pump 122 and ambient air in an external environment. For example, when the second valve 144 is in the open position (solid lines), the first pump 122 may draw in ambient air from the external environment. However, when the second valve 144 is moved to the closed position (dashed lines), the first pump 122 may be restricted from drawing in ambient air.

In some embodiments, the suction tool 10 may further include a temperature sensor 146. In these embodiments, the temperature sensor 146 may be operable to monitor a temperature of the first pump 122. When the temperature sensor 146 determines that the temperature of the first pump

122 has exceeded a predetermined threshold, the second valve 144 may be moved from the closed position to the open position, or to one of a plurality of intermediate positions, such that ambient air may enter the suction tool 10 and cool the first pump 122. In these embodiments, the second valve 144 may be manually moved between the open position and the closed position, such as by an external lever (not shown), or may be controlled via an electronic control unit, as will be described in additional detail herein. In addition, the second valve 144 may be moved to a selected one of the plurality of intermediate positions between the open position and the closed position based on the temperature of the first pump 122. For example, the second valve 144 may be positioned at an intermediate position closer to the open position as the temperature of the first pump 122 increases. Similarly, the second valve 144 may be positioned at an intermediate position closer to the to the closed position as the temperature of the first pump 122 decreases.

In the embodiments described herein, the suction tool 10 may further include a pressure sensor 150. The pressure sensor 150 may be disposed within the interior 103 of the suction mechanism 100 (e.g., within a cavity or the suction mechanism), and may be used to monitor a pressure differential between the interior 103 of the suction mechanism 100 and ambient pressure. In these embodiments, the pressure sensor 150 may include, for example, a barometric pressure sensor and the like.

Operation of the suction tool 10 will now be described in reference to FIG. 2. To initiate a grasp, the first pump 122 (e.g., the high flow pump) and the second pump 124 (e.g., the high pressure pump) may be activated. In these embodiments, the first valve 142 may be in the open position, such that the first pump 122 may be in fluid communication with the suction mechanism 100, and the second valve 144 may be in the closed position, such that the first pump 122 is unable to draw ambient air from the external environment. As a result, the first pump 122 may provide the first suction force and the first flow rate to the suction mechanism 100, while the second pump 124 may provide the second suction force and the second flow rate to the suction mechanism 100.

In these embodiments, the first flow rate provided by the first pump 122 may be a high flow rate operable to allow the suction tool 10 to initiate contact between the suction mechanism 100 and the object 101. Notably, the high flow rate may allow the suction mechanism 100 to grasp very light and/or irregularly shaped objects on which it may be difficult to create a quality seal.

Once contact has been established between the object 101 and the suction mechanism 100, the first suction force and the second suction force exerted by the first pump 122 and the second pump 124, respectively, may cause the internal pressure within the suction mechanism 100 to drop. As the pressure within the suction mechanism 100 drops, the pressure sensor 150 may continually monitor the pressure within the suction mechanism 100 in order to determine the quality of seal that has been achieved between the suction mechanism 100 and the object 101.

In some embodiments, the pressure within the suction mechanism 100 may drop to a pressure less than or equal to a first threshold pressure. In these embodiments, the first threshold pressure may correspond to the strongest first suction force (e.g., lowest pressure, strongest vacuum) that may be generated by the first pump 122. When the pressure value drops to a pressure less than or equal to the first threshold pressure, the pressure sensor 150 may indicate that a quality seal has been formed between the suction mechanism 100 and the object 101. If the pressure sensor 150 determines that a quality seal has been formed between the suction mechanism 100 and the object, the first valve 142 may be moved to the closed position and the first pump 122 may be deactivated.

With the first pump 122 deactivated and the first valve 142 moved to the closed position, only the second suction force and the second flow rate provided by the second pump 124 may act upon the suction mechanism 100. In embodiments in which the second pump 124 is a high pressure pump, the second suction force may be greater than the first suction force provided by the first pump 122, such that the second pump 124 may further lower the pressure within the suction mechanism 100 and increase the strength of the grip exerted from the suction mechanism 100 on the object 101.

In other embodiments, once contact has been established between the object 101 and the suction mechanism 100, the pressure within the suction mechanism 100 may only drop minimally, such that the internal pressure within the suction mechanism 100 is equal to or greater than a second threshold pressure. In these embodiments, the second threshold pressure may indicate that a poor seal between the suction mechanism 100 and the object 101 has been formed. For example, in these embodiments, a poor seal may correspond to a pressure drop that is less than 5%, less than 10%, or less than 20% of the maximum first suction force that may be generated by the first pump 122. Notably, a poor seal may be formed between the suction mechanism 100 and the object 101 in embodiments in which the object is a sponge, plush toy, or other porous and/or partially porous objects.

If the pressure sensor 150 determines that a poor seal has been formed between the suction mechanism 100 and the object 101, the second pump 124 may be deactivated. In these embodiments, the first pump 122 may remain activated and the first valve 142 may remain in the open position, such that only the first flow rate and the first suction force provided by the first pump 122 are utilized for the remainder of the suction operation.

In further embodiments still, once contact has been established between the object and the suction mechanism 100, the pressure within the suction mechanism 100 may drop to a level that is between the first threshold pressure and the second threshold pressure. In these embodiments, the pressure within the suction mechanism 100 may indicate that a moderate seal has been formed between the suction mechanism and the object. In these embodiments, a moderate seal may correspond to a seal that is stronger than the poor seal, but weaker than the quality seal. Furthermore, a pressure value between the first threshold pressure and the second threshold pressure may further signify that a significant flow rate is not being generated within the suction mechanism (e.g., in circumstances where the suction mechanism 100 contacts a flat surface that does not entirely cover the suction mechanism 100).

Under these circumstances, the second suction force and second flow rate provided by the second pump 124 to the suction mechanism 100 may be insufficient to maintain a grip on the object. Furthermore, the first pump 122 may quickly overheat as a result of insufficient airflow to the motor of the first pump 122. In these embodiments, the second pump 124 may be deactivated, and the second valve 144 may be gradually moved from the closed position to the open position, or to one of a plurality of intermediate positions. As the second valve 144 is moved to the open position, ambient air may enter the suction tool 10, particularly the first connection part 131 to cool the first pump 122, which may act to gradually increase the pressure within the suction mechanism 100, and, in turn, the first flow rate provided by the first pump 122. As ambient air cools the motor of the first pump 122, the first pump 122 may be operable to continue the suction operation with reduced risk of overheating. In addition, the second valve 144 may be moved to a selected one of the plurality of intermediate positions between the open position and the closed position based on the pressure differential detected by the pressure sensor 150 and/or the temperature of the first pump 122 detected by the temperature sensor 146, as discussed herein.

It should be noted that as ambient air flows into the suction tool 10 and the pressure within the suction mechanism 100 gradually increases, the object being grasped by the suction mechanism 100 may become detached. In these embodiments, the internal pressure within the suction mechanism 100 may be continually monitored to ensure that the suction mechanism 100 remains in contact with the object 101. For example, if the internal pressure within the suction mechanism 100 is equivalent to ambient pressure, the pressure sensor 150 may indicate that contact with the object 101 has been lost.

Figure 3:
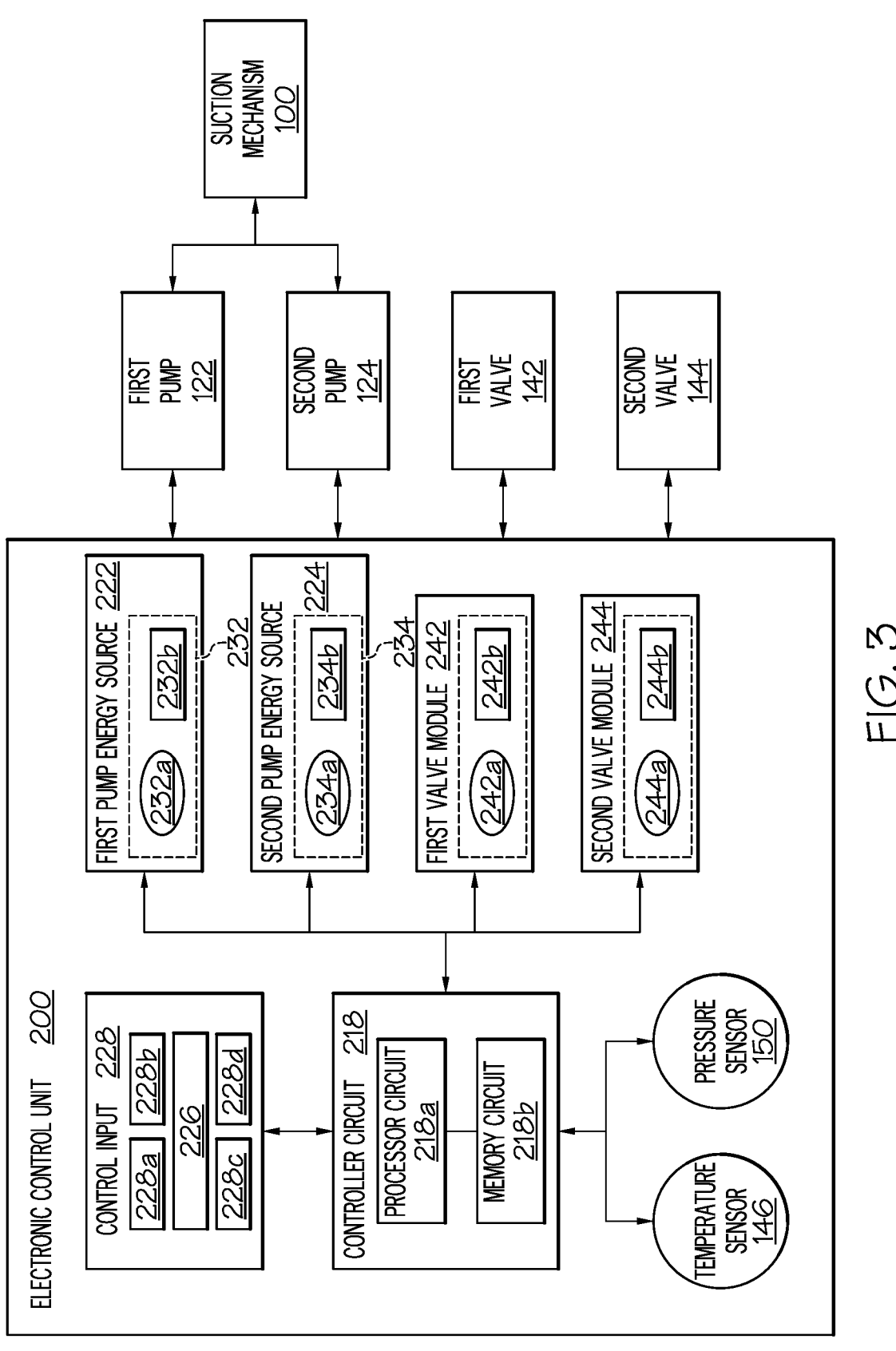
FIG. 3 is a schematic view of an electronic control unit for controlling the suction tool of FIG. 1, according to one or more embodiments shown and described herein.

As has been described herein, operation of the suction tool 10 may be further controlled via an electronic control unit 200, as depicted in FIG. 3. In these embodiments, the electronic control unit 200 may independently control both the first pump 122 and the second pump 124 based on the internal pressure within the suction mechanism 100. Furthermore, the electronic control unit 200 may further independently control both the first valve 142 and the second valve 144 in order to maintain operation of the suction tool 10 during a suction operation.

Referring still to FIG. 3, the electronic control unit 200 may include a controller circuit 218, a first pump energy source 222, a second pump energy source 224, the temperature sensor 146, and the pressure sensor 150. The electronic control unit 200 may further include a control input 228, such as a computer, which may allow a user to operate the electronic control unit 200. In these embodiments, the control input 228 may have a battery 226, and may provide automatic control of the electronic control unit 200 via a software program, or may be manually controlled via a user manipulating a user interface thereof.

The control input 228 may include control buttons and visual/aural indicators, such as displays and/or speakers, with the control buttons providing various functions over the electronic control unit 200, and with the visual/aural indicators providing visual/aural feedback to the status of one or more conditions and/or positions of components of the electronic control unit 200. In these embodiments, the control buttons may include one or more buttons 228a, 228b for activating the first pump 122 and/or the second pump 124, and one or more knobs and/or buttons 228c, 228d for moving the first valve 142 and/or the second valve 144 between the open position and the closed position.

Referring still to FIG. 3, the controller circuit 218 may be electrically and communicatively coupled to the first pump energy source 222, the second pump energy source 224, the temperature sensor 146, the pressure sensor 150, and the control input 228, such as by one or more wires or circuit traces. In these embodiments, the controller circuit 218 may be assembled on an electrical circuit, and may include, for example, a processor circuit 218a and a memory circuit 218b.

The processor circuit 218a may have one or more programmable microprocessors and associated circuitry, such as an input/output interface, buffers, memory, etc. The memory circuit 218b may communicatively coupled to the processor circuit 218a, e.g., via a bus circuit, and may be a non-transitory electronic memory that may include volatile memory circuits, such as random access memory (RAM), and non-volatile memory circuits, such as read only memory (ROM), electronically erasable programmable ROM (EE-PROM), flash memory, etc. The controller circuit 218 may be formed as one or more Application Specific Integrated Circuits (ASIC).

The controller circuit 218 may be configured via software and/or firmware residing in the memory circuit 218*b* to execute program instructions to perform functions associated with the activation of the first pump 122 and/or the second pump 124 and/or the position of the first valve 142 and/or the second valve 144.

Referring again to FIG. 3, the first pump energy source 222 may include a first pump module 232. In these embodiments, the first pump module 232 may be electrically and controllably coupled to the controller circuit 218. As provided herein, the first pump module 232 may be electrically and controllably coupled to the controller circuit 218 by way of electrical wiring or any other suitable electrical connections, such that user inputs on the control input 228 may be relayed to the controller circuit 218 and used to control the power delivered by the first pump module 232 to the first pump 122. In these embodiments, the first pump module 232 may include a power source 232*a*, such as an electric motor, to which an electric lead 232*b* is attached.

Similarly, the second pump energy source 224 may include a second pump module 234. The second pump module 234 may be electrically and controllably coupled to the controller circuit 218 by way of electrical wiring or any other suitable electrical connections, such that user inputs on the control input 228 may be relayed to the controller circuit 218 and used to control the power delivered by the second pump module 234 to the second pump 124. In these embodiments, the second pump module 234 may include a power source 234*a*, such as an electric motor, to which an electric lead 234*b* is attached.

Referring still to FIG. 3, the temperature sensor 146 and the pressure sensor 150 may be similarly coupled to the controller circuit 218 by way of electrical wiring or any other suitable connections. In these embodiments, the temperature values recorded by the temperature sensor 146 and the pressure values recorded by the pressure sensor 150 may be conveyed to a user via a user interface of the electronic control unit 200. In response to the temperature and/or pressure values recorded by the temperature sensor 146 and the pressure sensor 150, the user may utilize the electronic control unit 200 to move the first valve 142 and/or the second valve 144, such that a desired temperature and/or pressure value is achieved.

In these embodiments, the electronic control unit 200 may further include a first valve module 242 and a second valve module 244, with the first valve module 242 and the second valve module 244 being operable to control the movement of the first valve 142 and the second valve 144 between the open position and the closed position, respectively. In these embodiments, the first valve module 242 may include a power supply 242*a*, such as an electric motor, that is operable to move the first valve 142 between the open position and the closed position via an electric lead 242*b*. Similarly, the second valve module 244 may include a power supply 244*a*, such as an electric motor, that is operable to move the second valve 144 between the open position and the closed position via an electric lead 244*b*.

In the embodiments described herein, the electronic control unit 200 may be operable to control the first pump 122 and the second pump 124, such that the electronic control unit 200 controls the first flow rate and first suction force provided to the suction mechanism 100 by the first pump 122 and the second flow rate and the second suction force provided to the suction mechanism 100 by the second pump 124.

For example, once the suction mechanism 100 is positioned adjacent the object 101, the first pump module 232 and the second pump module 234 may activate the first pump 122 and the second pump 124, respectively. With the first pump 122 and the second pumps 124 activated, the pressure sensor 150 may gauge the internal pressure in the suction mechanism 100 to determine the quality of the seal created between the suction mechanism 100 and the object 101. Depending on the internal pressure of the suction mechanism 100 (e.g., less than or equal to the first threshold pressure, equal to or greater than the second threshold pressure, or between the first threshold pressure and the second threshold pressure) the electronic control unit 200 may further operate the first valve 142 and/or the second valve 144 of the suction tool 10 to ensure that the suction process may be completed, as has been described herein.

Figure 4:
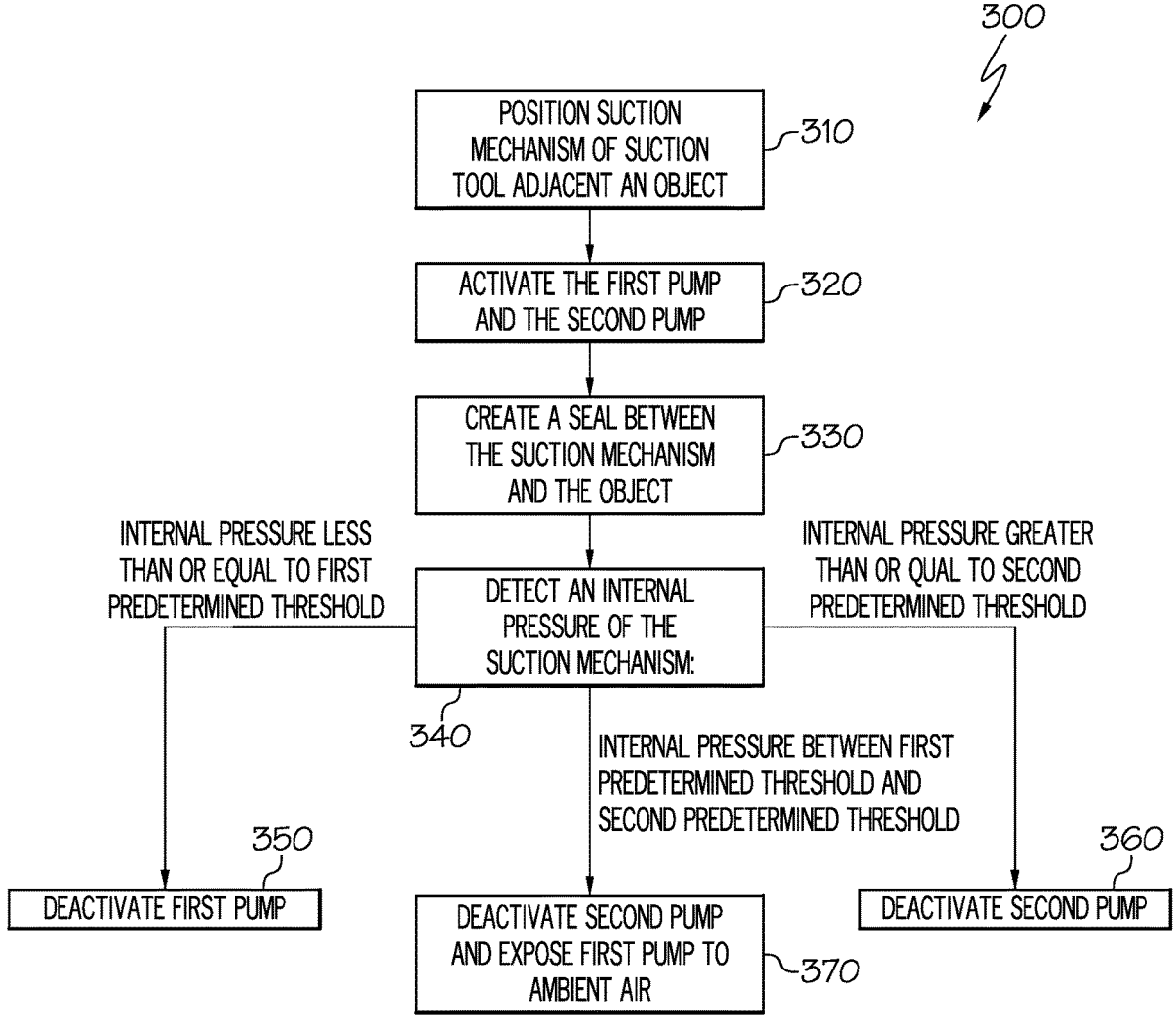
FIG. 4 is an illustrative flow diagram of a method for operating the suction tool of FIG. 1, according to one or more embodiments shown and described herein.

Referring now to FIG. 4, an illustrative flow diagram of a method 300 for performing a suction operation is depicted with reference to the suction tool 10 depicted in FIG. 2 and the electronic control unit 200 depicted in FIG. 3. In these embodiments, the method 300 may begin at block 310, which may involve positioning the suction mechanism 100 of the suction tool 10 adjacent the object 101 to be grasped. Once the suction mechanism 100 is positioned, the method 300 may proceed to block 320, which may involve activating the first pump 122 generating a first flow rate and a first suction force within the suction mechanism 100 and the second pump 124 generating a second flow rate and a second suction force within the suction mechanism 100. It should be understood that, in some embodiments, the first pump 122 and the second pump 124 may be manually activated and operated, while in other embodiments, the electronic control unit 200 may be electrically coupled to the first pump 122 and the second pump 124 and may be operable to control the first pump 122 and the second pump 124.

With the first pump 122 and the second pump 124 activated, the method 300 may move to block 330, which may involve creating a seal between the suction mechanism 100 and the object 101 using the first flow rate and first suction force provided by the first pump 122 and the second flow rate and the second suction force provided by the second pump 124.

Referring still to FIG. 4, the method 300 may further involve determining the quality of the seal created between the suction mechanism 100 and the object 101, as is depicted at block 340. In these embodiments, the method 300 of determining the quality of the seal may further involve monitoring the internal pressure within the suction mechanism 100 using a pressure sensor 150.

In the event the internal pressure within the suction mechanism 100 is less than or equal to the first threshold pressure, the suction tool 10 may have achieved a quality seal between the suction mechanism 100 and the object 101. In these embodiments, the method 300 may proceed to block 350, which may involve deactivating the first pump 122 and closing the first valve 142 positioned between the first pump 122 and the suction mechanism 100. With the first pump 122 deactivated, the second suction force of the second pump may be used to lower the internal pressure of the suction mechanism 100 further, thereby generating and maintaining a strong grip on the object 101.

Alternatively, in the event the internal pressure within the suction mechanism 100 remains equal to or greater than the second threshold pressure, the suction tool 10 may have achieved a poor seal between the suction mechanism 100 and the object 101. In these embodiments, the method 300 may proceed to block 360, which may involve deactivating the second pump 124. With the second pump 124 deactivated, the first flow rate and the first suction force generated by the first pump 122 may be used to complete the suction operation.

In other embodiments still, the internal pressure within the suction mechanism 100 may be between the first threshold pressure and the second threshold pressure. In these embodiments, the suction tool 10 may have achieved a moderate seal between the suction mechanism 100 and the object 101. As a result, the method 300 may move to block 370, which may involve deactivating the second pump 124 and moving the second valve 144 from the closed position to the open position, such that ambient air from an external environment may gradually increase the internal pressure of the suction mechanism and cool the motor of the first pump 122.

As previously discussed herein, it should be understood that method 300 may be conducted manually by a user or operated by the electronic control unit 200. For example, the first pump 122, the second pump 124, the first valve 142, and the second valve 144 may be manually operated in response to the pressure and/or temperature values obtained by the pressure sensor 150 and the temperature sensor 146, respectively. In contrast, these components may be similarly controlled by the electronic control unit 200.

Furthermore, in embodiments in which the electronic control unit 200 is used to operate the suction tool 10, it should be understood that operation of the suction tool 10 may be automated. For example, the electronic control unit 200 may be programmed to automatically activate and/or deactivate the first pump 122 and/or the second pump 124 depending on the internal pressure of the suction mechanism 100 determined by the pressure sensor 150. Similarly, the electronic control unit 200 may be operable to automatically open and/or close the second valve 144 based on the temperature of the first pump 122 recorded by the temperature sensor 146.

As should be appreciated in view of the foregoing, a suction tool is described herein. The suction tool may include a suction mechanism, a first pump operable to provide a first suction force and a first flow rate, a second pump operable to provide a second suction force and a second flow rate, and a connection member placing the first pump and the second pump in fluid communication with the suction mechanism. In some embodiments, the suction tool may further include an electronic control unit, which may be operable to independently activate and operate the first pump and the second pump in response to a detected pressure within the suction mechanism.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robotic arm comprising:
   an arm segment; and
   a suction tool provided at an end of the arm segment, the suction tool comprising;
   a suction mechanism;
   a first pump operable to provide a first suction force and a first flow rate at the first pump and to the suction mechanism;
   a second pump operable to provide a second suction force and a second flow rate at the second pump and to the suction mechanism; and
   a connection member placing the first pump and the second pump in fluid communication with the suction mechanism,
   wherein the first suction force provided by the first pump is different from the second suction force provided by the second pump.

2. The robotic arm of claim 1, wherein the second suction force provided by the second pump is greater than the first suction force provided by the first pump.

3. The robotic arm of claim 1, wherein the first flow rate provided by the first pump is different from the second flow rate provided by the second pump.

4. The robotic arm of claim 3, wherein the first flow rate provided by the first pump is greater than the second flow rate provided by the second pump.

5. The robotic arm of claim 1, wherein the suction tool further comprises a first valve positioned between the first pump and the suction mechanism, the first valve being movable between an open position and a closed position.

6. The robotic arm of claim 5, wherein fluid communication between the first pump and the suction mechanism is prevented when the first valve is in the closed position.

7. The robotic arm of claim 5, wherein the suction tool further comprises a second valve operably coupled to the first pump, the second valve being movable between an open position and a closed position.

8. The robotic arm of claim 7, wherein the first pump is exposed to ambient air from an external environment when the second valve is in the open position.

9. The robotic arm of claim 1, wherein the suction tool further comprises a pressure sensor provided within an interior of the suction mechanism for detecting an internal pressure of the suction mechanism.

10. A suction tool comprising:
    a suction mechanism;
    a first pump operable to provide a first suction force and a first flow rate at the first pump and to the suction mechanism;
    a second pump operable to provide a second suction force and a second flow rate at the second pump and to the suction mechanism;

a connection member placing the first pump and the second pump in fluid communication with the suction mechanism; and an electronic control unit that independently operates each of the first pump and the second pump based on a detected pressure within the suction mechanism, wherein the second suction force is greater than the first suction force and the first flow rate is greater than the second flow rate.

11. The suction tool of claim 10, further comprising a first valve positioned between the first pump and the suction mechanism, the first valve being movable between an open position and a closed position.

12. The suction tool of claim 11, wherein fluid communication between the first pump and the suction mechanism is prevented when the first valve is in the closed position.

13. The suction tool of claim 11, further comprising a second valve operably coupled to the first pump, the second valve being movable between an open position and a closed position.

14. The suction tool of claim 13, wherein the first pump is exposed to ambient air from an external environment when the second valve is in the open position.

15. A method comprising:

positioning a suction mechanism of a suction tool adjacent an object;

activating a first pump generating a first flow rate and a first suction force at the first pump and within the suction mechanism;

activating a second pump generating a second flow rate and a second suction force at the second pump and within the suction mechanism, the second flow rate and the second suction force being different than the first flow rate and the first suction force, respectively;

creating a seal between the suction mechanism and the object;

detecting an internal pressure within the suction mechanism of the suction tool using a pressure sensor; and determining if the internal pressure is less than or equal to a first threshold pressure, equal to or greater than a second threshold pressure, or between the first threshold pressure and the second threshold pressure.

16. The method of claim 15, further comprising deactivating the first pump in response to determining that the internal pressure is less than or equal to the first threshold pressure.

17. The method of claim 15, further comprising deactivating the second pump in response to determining that the internal pressure is equal to or greater than the second threshold pressure.

18. The method of claim 15, further comprising deactivating the second pump and exposing the first pump to ambient air from an external environment in response to determining that the internal pressure is between the first threshold pressure and the second threshold pressure.

19. The robotic arm of claim 1, wherein:

the suction mechanism comprises a suction cup; and the first pump and the second pump are in fluid communication with the suction cup.

* * * * *